United States Patent
Cho et al.

(10) Patent No.: US 7,130,543 B2
(45) Date of Patent: Oct. 31, 2006

(54) BIT RATE-INDEPENDENT OPTICAL RECEIVER

(75) Inventors: Kyu-Hyoung Cho, Yongin-shi (KR); Yun-Je Oh, Suwon-shi (KR); Jun-Ho Koh, Suwon-shi (KR); Byung-Jik Kim, Songnam-shi (KR); Chan-Youl Kim, Buchun-shi (KR); Chang-Hyun Lee, Seoul (KR)

(73) Assignee: Samsung Electronics Co. LTD, Suwon-Si (KR)

( * ) Notice: Subject to any disclaimer, the term of this patent is extended or adjusted under 35 U.S.C. 154(b) by 623 days.

(21) Appl. No.: 10/043,617

(22) Filed: Jan. 10, 2002

(65) Prior Publication Data

US 2003/0016423 A1 Jan. 23, 2003

(30) Foreign Application Priority Data

Jul. 23, 2001 (KR) ............... 2001-44093

(51) Int. Cl.
*H04B 10/00* (2006.01)
(52) U.S. Cl. ...................... 398/155; 398/206
(58) Field of Classification Search ........ 398/202–214, 398/154–155, 158
See application file for complete search history.

(56) References Cited

U.S. PATENT DOCUMENTS

| 5,864,416 | A | * | 1/1999 | Williams ................... 398/202 |
| 6,163,709 | A | * | 12/2000 | Chorey et al. ............ 455/552.1 |
| 6,337,886 | B1 | * | 1/2002 | Asahi ........................ 375/316 |
| 6,480,315 | B1 | * | 11/2002 | Brown ....................... 398/202 |
| 6,693,981 | B1 | * | 2/2004 | Yang et al. ................. 375/340 |
| 2001/0019441 | A1 | * | 9/2001 | Kogure et al. ............. 359/158 |
| 2003/0020987 | A1 | * | 1/2003 | Kanesaka ................... 359/158 |

* cited by examiner

*Primary Examiner*—Agustin Bello
(74) *Attorney, Agent, or Firm*—Cha & Reiter, LLC

(57) ABSTRACT

A bit rate-independent optical receiver ensures transparency with respect to changes of the transmission format and its associated bit rate in relation to an optical communications system. The optical receiver includes an opto-electric converter for converting an input optical signal into an electric signal, an amplifier circuit for amplifying the electrical signal, a bit rate-sensing circuit for generating a sensing signal with a voltage level determined on the basis of the bit rate of the electrical signal, a bit rate-recognition circuit for generating a recognition signal further amplified from the sensing signal, and a clock/data recovery circuit for reproducing a clock signal and data from the amplified electrical signal in accordance with a control signal. A controller determines a bit rate corresponding to the voltage level of the recognition signal by referring to a look-up table of the bit rate to the voltage level and provides the clock/data recovery circuit with the control signal representative of the bit rate.

7 Claims, 7 Drawing Sheets

FIG.1 [PRIOR ART]

BIT RATE-INDEPENDENT OPTICAL RECEIVER

CLAIM OF PRIORITY

This application makes reference to and claims all benefits accruing under 35 U.S.C. Section 119 from an application for "Bit Rate-Independent Optical Receiver," filed in the Korean Industrial Property Office on Jul. 23, 2001 and there duly assigned Serial No. 44093/2001.

BACKGROUND OF THE INVENTION

1. Field of the Invention

The present invention relates to optical communications systems and, in particular, to a bit rate-independent optical receiver for use in optical communications systems.

2. Description of the Related Art

In general, optical transmission systems are provided with various communications protocols, i.e., Fiber-Distributed Data Interface (FDDI), Enterprise Systems Connectivity (ESCON), Fiber Channel, Gigabit Ethernet and/or Asynchronous Transfer Mode (ATM). These protocols operate at different bit rates, including 125 Mb/s, 155.520 Mb/s, 200 Mb/s, 622.080 Mb/s, 1062.500 Mb/s, 1.25 Gb/s or 2488.320 Gb/s, etc. As a predetermined bit rate of the optical signal is normally applied to an optical communications system with a selected specific protocol/bit rate, an optical receiver for use in the optical communications system must meet the predetermined bit rate. The function of the optical receiver is to convert an input optical signal into an electrical signal and then recover from the electrical signal the original data without noise.

FIG. 1 shows a schematic block diagram of an optical receiver according to a prior art and includes an opto-electric converter 110, a low-noise amplifier 120, a limiting amplifier 130, and a clock/data recovery circuit 140. In use, the opto-electric converter 110 serves to convert an input-optical signal into an electrical signal. The low-noise amplifier 120 serves to eliminate noise from the electrical signal and amplify the electrical signal by a predetermined amplifying factor, while the limiting amplifier 130 serves to re-amplify the amplified electrical signal of the low-noise amplifier 120 within the limit of a predetermined voltage level. The clock/data recovery circuit 140 includes a phase-locked-loop (PLL) circuit with a reference-clock generator for generating the reference clock of a single frequency corresponding to a particular bit rate. The clock/data recovery circuit 140 serves to reshape the re-amplified electrical signal on the basis of the reference clock of the reference clock generator.

However, the aforementioned optical receiver usually does not adapt easily to any changes in the transmission format and its bit rate (so-called "transparency"). Thus, it has drawbacks in that it is not applicable to optical communications systems in which more than one transmission format is intended for use, and a frequent change in the transmission format is required.

Furthermore, such non-transparency makes it difficult for the optical communications system to perform a real-time monitoring operation in relation to any deteriorative accumulation of the optical signals, such as amplification noise occurring in between network sections, non-linearity of the optical signals, dispersion of color, etc. Therefore, it causes a considerable limitation in some practical applications of optical networks, i.e., optical line dividers.

SUMMARY OF THE INVENTION

The present invention is therefore directed to a bit rate-independent optical receiver capable of ensuring transparency with respect to changes in the transmission format and its associated bit rate in relation to an optical communications system.

The present invention is therefore directed to a bit rate-independent optical receiver that is capable of operating to meet the network-protection switching time required in the ring/mesh structure of synchronous optical network.

The present invention is still further directed to a bit rate-independent optical receiver that is capable of providing a wider range of bit rates of the optical signals recognizable in an optical communications system.

Accordingly, the inventive bit rate-independent optical receiver includes: an opto-electric converter for converting an input optical signal into an electrical signal; an amplifier circuit for amplifying the electrical signal; a bit rate-sensing circuit connected to receive the amplified electrical signal for generating a sensing signal with a voltage level that is determined on the basis of the bit rate of the electrical signal; a bit rate recognition circuit for generating a recognition signal that is further amplified from the sensing signal, the bit rate-recognition circuit having a structure of providing an extended range of recognizable total-input voltages by connecting a plurality of logarithm amplifiers in series, each of which logarithm amplifiers has a predetermined range of recognizable input voltage; a clock/data recovery circuit for reproducing a clock signal and data from the amplified electrical signal in accordance with a control signal and outputting the reproduced clock signal and data; and, a controller for determining a bit rate corresponding to the voltage level of the recognition signal by referring to a look-up table defining a predetermined relationship of the bit rate to the voltage level and for providing the clock/data recovery circuit with the control signal representative of the bit rate.

Preferably, the amplifier circuit further includes a low-noise amplifier for eliminating noise from the electrical signal outputted from the opto-electric converter and for amplifying the noise-free electrical signal by a given amplification factor; and, a limiting amplifier for re-amplifying the amplified electrical signal within a predetermined voltage level.

Preferably, the bit rate-recognition circuit further includes a plurality of the logarithm amplifiers connected to sequentially amplify the sensing signal outputted from the bit rate-sensing circuit; a plurality of rectifiers respectively connected to one input of the respective logarithm amplifiers and to one output of logarithm amplifiers for rectifying the sensing signal inputted thereto; and, an adder connected to provide a sum of output signals of the plurality of rectifiers.

Preferably, the clock/data recovery circuit further includes a phase-locked loop circuit for generating a reference clock signal in accordance with the control circuit provided by the controller and at least one flip-flop connected to reproduce a clock signal and data, in accordance with the reference clock signal, from the amplified electrical signal supplied from the amplifier circuit.

Preferably, the phase locked loop circuit further includes a phase comparator for comparing the frequency and the phase of the amplified electrical signal outputted from the amplifier circuit with those of the reference clock signal and consequently providing an error voltage according to the comparison; a loop filter for filtering the error voltage outputted from the phase comparator and providing the filtered-error voltage; and, a voltage-controlled oscillator for generating the corresponding reference clock signal on the basis of the error voltage of the loop filter and the control signal for oscillation of the controller.

Preferably, the controller includes a memory for storing a look-up table indicating a predetermined data set of the bit rate to the voltage level.

BRIEF DESCRIPTION OF THE DRAWING

The foregoing and other features and advantages of the invention will be apparent from the following more detailed description of preferred embodiments as illustrated in the accompanying drawings wherein the same reference characters refer to the same parts or components throughout the various views. The drawings are not necessarily to scale, the emphasis is placed instead upon illustrating the principles of the invention, wherein.

DETAILED DESCRIPTION OF THE INVENTION

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For the purpose of simplicity and clarity, detailed descriptions of well-known devices and methods are omitted so as not to obscure the description of the present invention with unnecessary detail.

Figure 1:
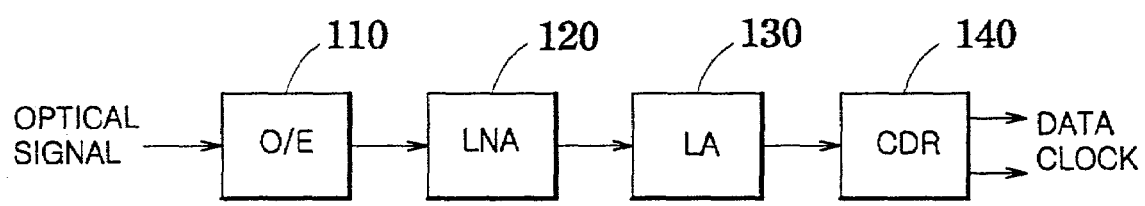
FIG. 1 illustrates the structure of an optical receiver according to a prior art system.
Figure 2:
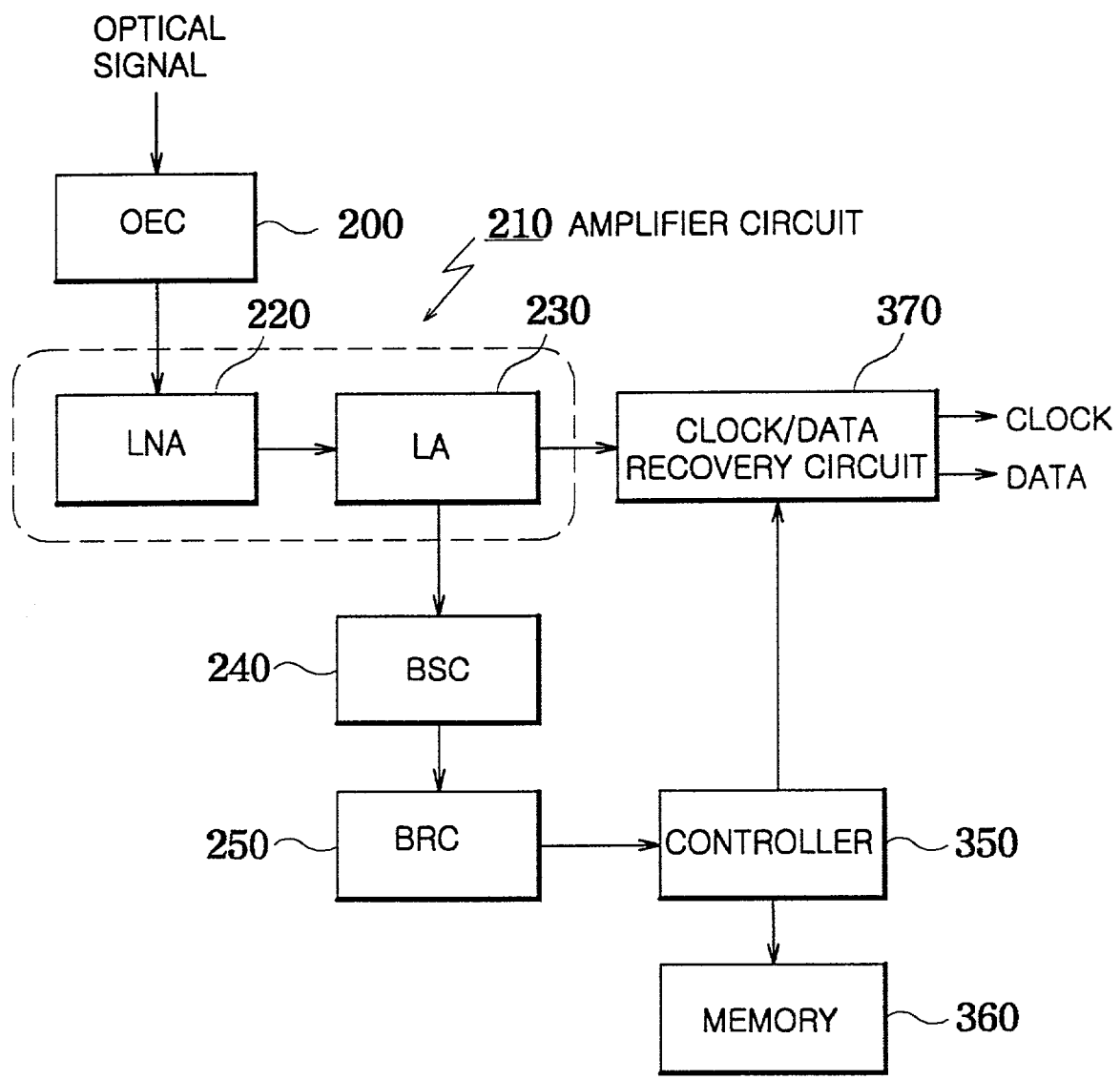
FIG. 2 illustrates the structure of a bit rate-independent optical receiver according to a preferred embodiment of the present invention.

Referring now to FIG. 2, the optical receiver, according to a preferred embodiment of the present invention, includes an opto-electric converter 200, an amplifier 210, a bit rate-sensing circuit 240, a bit rate-recognition circuit 250, a clock/data recovery circuit 370, a memory 360 and a controller 350.

In operation, the opto-electric converter 200 converts an input optical signal into an electrical signal and provides the converted signal at its output. Preferably, a photodiode may be used for this opto-electrical converter.

The amplifier 210 includes a low-noise amplifier 220 and a limiting amplifier 230, in which the low-noise amplifier 220 serves to remove noise from the electrical signal supplied from the opto-electric converter 200 and amplify the noise-free electrical signal by a predetermined amplification factor, and the limiting amplifier 230 serves to re-amplify the above-amplified electrical signal within the limit of a predetermined voltage level.

The bit rate sensing circuit 240 receives the amplified electrical signal and outputs a sensing signal having a predetermined voltage level corresponding to the bit rate of an optical signal. Preferably, a low-pass filter or a transmission line may be used for the bit rate-sensing circuit 240.

Figure 3:
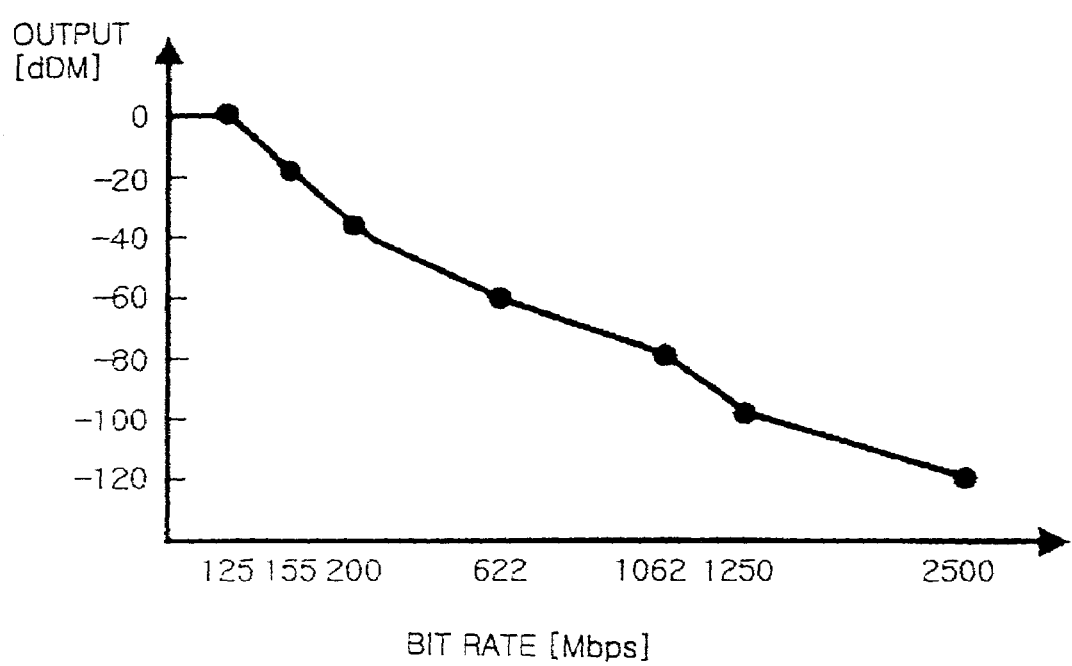
FIG. 3 is a schematic graphic diagram representing an exemplary output characteristic of a low-pass filter of FIG. 2 according to the present invention.

FIG. 3 shows a schematic graphic diagram representing, by way of example, the output characteristic of a low-pass filter of FIG. 2 according to the present invention. As shown in FIG. 3, note the output voltage changes according to the bit rate of the electrical signal inputted to the low-pass filter. This characteristic complies with Parseval's Theorem, which proposes that the total power in a time domain is equal to the total power in a frequency domain. The energy of the electrical signal passing through the low-pass filter is concentrated on a lower-frequency region as its bit rate decreases. In addition, the low-pass filter makes it possible to efficiently eliminate any white noise or Gaussian noise that may be included in the input signal by adjusting its cutoff frequency.

In a case where a transmission line is used for the bit rate sensing circuit 240 and the impedance of the transmission line is initially set to a predetermined value, for instance, 50Ω (ohms) for a bit rate 2.5 Gbps upon manufacturing its printed circuit boards in the production line, the voltage level of an output electrical signal fluctuates due to the dielectric loss of line as the bit rate of the input electrical-signal changes.

Figure 4:
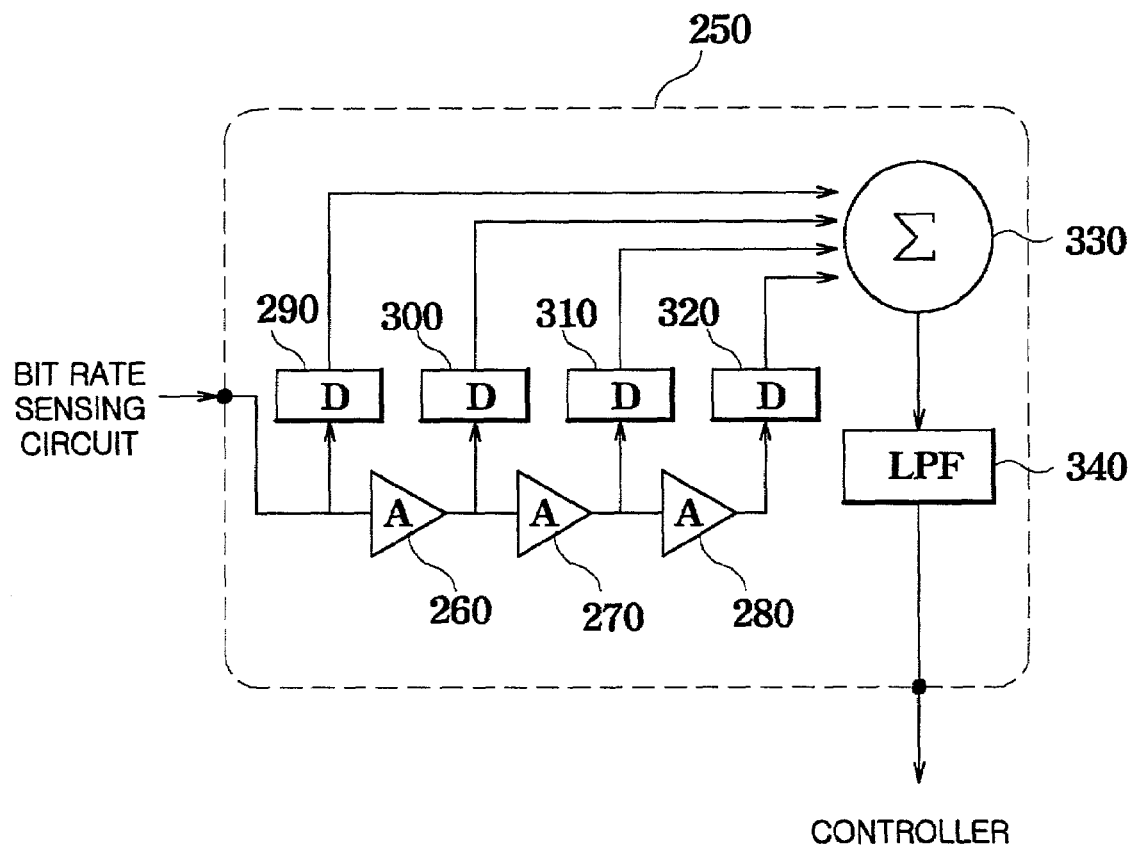
FIG. 4 illustrates the structure of a bit rate-recognition circuit of FIG. 2 according to a preferred embodiment of the present invention.

Referring to FIGS. 2 and 4, the bit rate-recognition circuit 250 includes first, second, and third logarithm amplifiers 260, 270, and 280; first, second, third, and fourth rectifiers 290, 300, 310, and 320; an adder 330; and, a low-pass filter 340.

The first, second and third logarithm amplifiers 260, 270 and 280, connected in series, respectively have a given range of receivable input voltages and voltage gains, and serve to convert the voltage level of an input electrical signal with the characteristic of an exponential function into a voltage level of the output signal with the characteristic of linear changes. To this end, the input-sensing signal applied from the bit rate-sensing circuit 240 to the first logarithm amplifier 260 is sequentially amplified while passing through the subsequent logarithm amplifiers 270 and 280.

Figure 5:
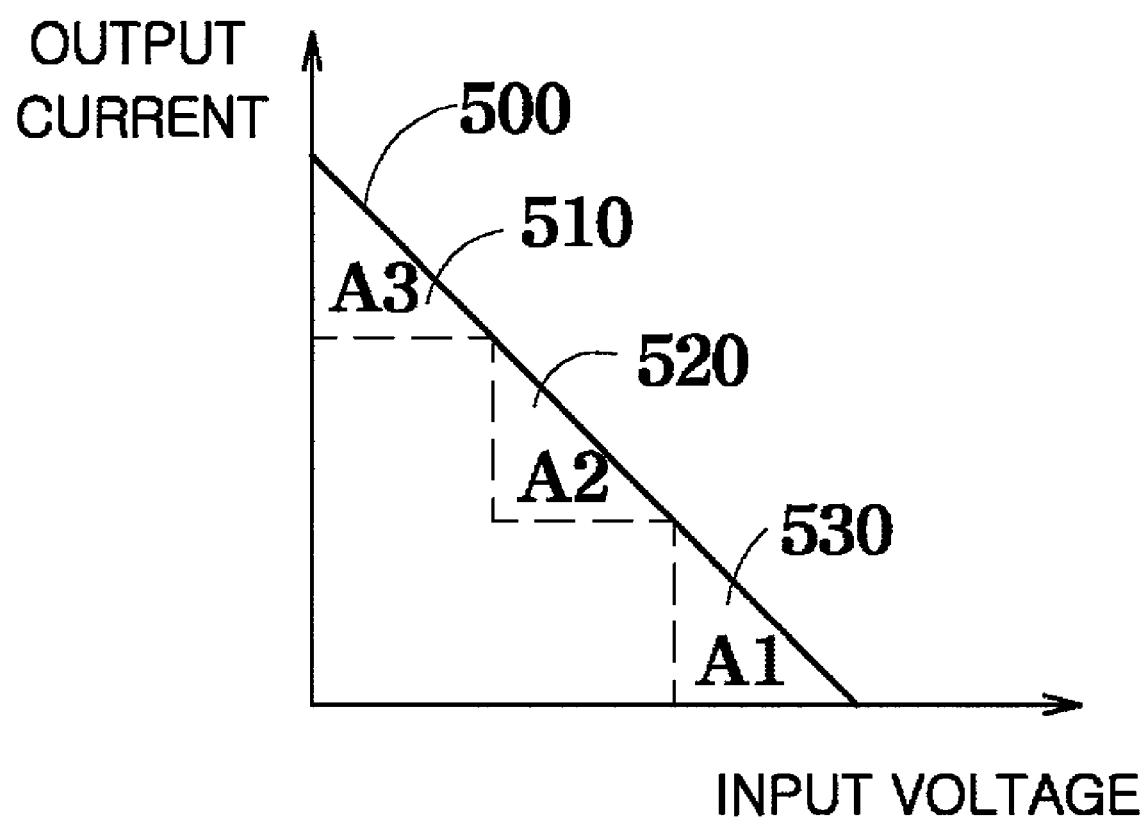
FIG. 5 is a schematic graphic diagram showing the operation of a bit rate-recognition circuit of FIG. 4 according to a preferred embodiment of the present invention.

FIG. 5 shows a schematic graphic diagram explaining the operation of the first, second, and third logarithm amplifiers 260, 270, and 280 of the bit rate-recognition circuit of FIG. 4 according to the present invention, and their respective output curves 510, 520, and 530 that are overlapped with each other to form a single total output curve 500. A totally recognizable range of input voltages for the first, second, and third logarithm amplifiers 260, 270, and 280 will be a sum of the respective recognizable range of input voltages. It is, therefore, appreciated by those skilled in this art that the sum of each recognizable range of input voltages for the first, second, and third logarithm amplifiers 260, 270, and 280 would eventually constitute a single extended range of input voltages, so that the bit rate-recognition circuit 250 can process therein.

One input of the first, second, and third logarithm amplifiers 260, 270, and 280 are respectively coupled to the first, second, and third rectifiers 290, 300, and 310. A fourth rectifier 320 is coupled to the output of the third logarithm amplifier 280. These rectifiers serve to rectify the input electrical signal. The adder 330 adds each rectified input electrical signal from the first, second, third, and fourth rectifiers 290, 300, 310, and 320, then outputs the sum as a recognition signal. The low-pass filter 340 serves to reduce the ripples of the recognition signal and provides the same to the controller 350.

Figure 6:
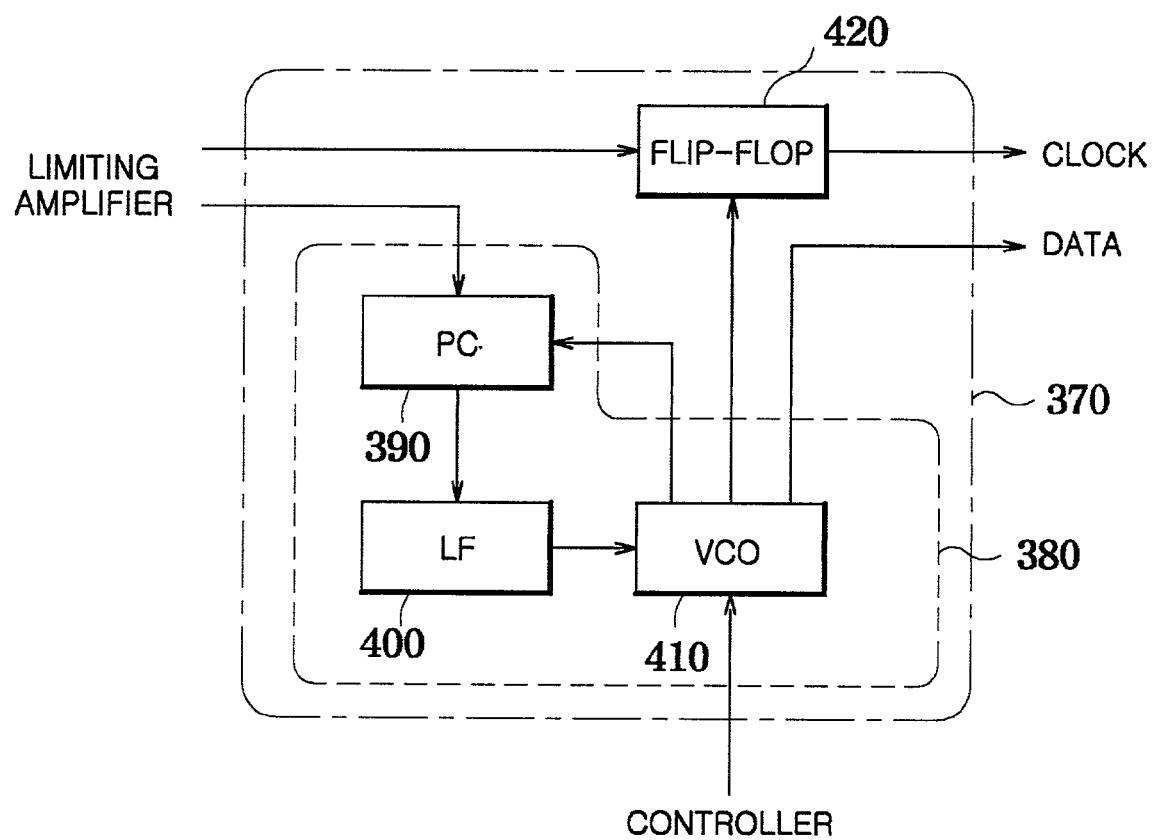
FIG. 6 illustrates the structure of a clock/data recovery circuit of FIG. 2 according to a preferred embodiment of the present invention; and, FIG. 7 is a schematic graphic diagram explaining the performance of the optical receiver of FIG. 2 according to a preferred embodiment of the present invention.

FIG. 6 illustrates the structure of a clock/data recovery circuit 370 of FIG. 2 according to a preferred embodiment of the present invention. The clock/data recovery circuit 370 serves to reproduce clock and data signals from the re-amplified input electrical signal of the limiting amplifier 230 in accordance with a control signal from the controller 350.

The clock/data recovery circuit 370 preferably includes a phase-locked loop (PLL) circuit 380 for providing a reference clock signal in accordance with the control signal of the controller 350 and a flip-flop 420 for providing the clock and data signals reproduced from the re-amplified electrical signal of the limiting amplifier 230 in accordance with the reference clock signal.

The phase-locked loop (PLL) circuit 380 preferably includes a phase comparator 390, a loop filter 400, and a voltage-controlled oscillator 410. The phase comparator 390 serves to compare the frequency and phase of the re-amplified electrical signal provided by the limiting amplifier 230 with those of the reference clock signal and provide an error voltage.

The loop filter 400 performs filtering onto the error voltage applied from the phase comparator 390, that is, by eliminating high-frequency noise components out of the error voltage. A low-pass filter may be used for this loop filter 400.

The voltage-controlled oscillator 410 provides the reference clock signal in accordance with the error voltage applied from the loop filter 400 and the control voltage applied from the controller 350. The reference clock signal outputted from the voltage controlled oscillator 410 is fed back to the phase comparator 390 and then inputted to the flip-flop 420, so as to be used as the reference clock signal for recovery of the data.

The controller 350 outputs a predetermined control signal according to the voltage level of the recognition signal applied from the bit rate-recognition circuit 250, in which the controller 250 determines the bit rate from the voltage level of the recognition signal on the basis of a look-up table stored in the memory 360. Once the bit rate is determined, the control signal corresponding to the determined bit rate is provided to the clock/data recovery circuit 370.

Figure 7:
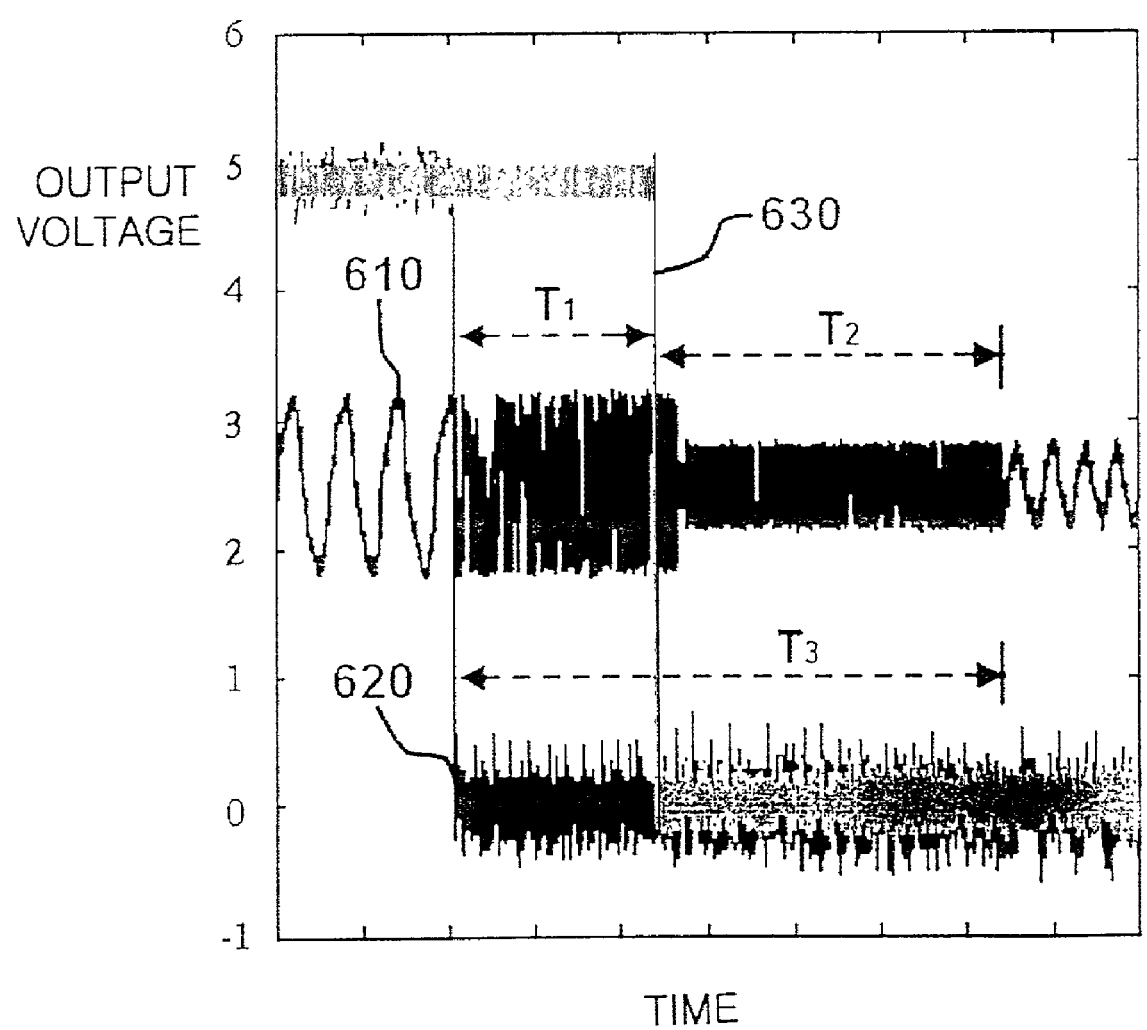

Referring now to FIG. 7, there is shown a schematic waveform diagram explaining the performance of the optical receiver of FIG. 2 according to a preferred embodiment of the present invention, in which the waveforms are indicated by reference numerals 610, 620, and 630, wherein each represents voltage levels measured at three different positions of the optical receiver. In particular, the graph represents a condition where a channel of the optical signal inputted into the optical receiver changes from a Fiber Distributed Data Interface (FDDI) channel to an Enterprise Systems Connection (ESCON) channel. A first time period $T_1$ represents a response time of the bit rate-recognition circuit 250, which is about 2.2 ms. A second time period $T_2$ represents a setting time required in the clock/data recovery circuit 370, which is about 4.3 ms. A third time period $T_3$ represents a response time of the optical receiver, which is about 6/5 ms.

As apparent from the foregoing description, it will be appreciated that the bit rate-independent optical receiver according to the present invention has an advantage in that it enables transparency with regard to any changes of the transmission format and its associated bit rate, by means of the bit rate-recognition circuit as disclosed heretofore. Furthermore, the bit rate-independent optical receiver according to the present invention will lead to a minimized response time in an optical communications system. Furthermore, the bit rate-independent optical receiver according to the present invention will have a further advantage in that it provides a wider range of recognizable bit rates of the optical signal, by means of a plurality of logarithm amplifiers connectable in series.

While the preferred embodiments of the present invention have been illustrated and described, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention; instead, it is intended that the present invention include all embodiments falling within the scope of the appended claims.

What is claimed is:

1. A bit rate-independent optical receiver, comprising:
    an opto-electric converter configured to convert an input optical signal into an electric signal;
    an amplifier circuit configured to amplify the electrical signal;
    a bit rate-sensing circuit connected to receive the amplified electrical signal and configured to generate a sensing signal with a voltage level determined on the basis of a bit rate of the electrical signal;
    a bit rate-recognition circuit configured to generate a recognition signal that is further amplified from the sensing signal, said bit rate-recognition circuit having a structure of providing an extended range of recognizable total input voltages by connecting a plurality of logarithm amplifiers in series, each of which logarithm amplifiers has a predetermined range of recognizable input voltage;
    a clock/data recovery circuit configured to reproduce a clock signal and data from the amplified electrical signal in accordance with a control signal and outputting the reproduced clock signal and data; and,
    a controller configured to determine a bit rate corresponding to a voltage level of the recognition signal by referring to a look-up table defining a predetermined relationship of the bit rate to the voltage level, and for providing the clock/data recovery circuit with the control signal representative of the bit rate.

2. The optical receiver of claim 1, wherein the amplifier circuit further comprises a low-noise amplifier configured to eliminate noise from the electrical signal outputted from the optoelectric converter and amplify the noise-free electrical signal by a given amplification factor; and, a limiting amplifier configured to re-amplify the amplified electrical signal within a predetermined voltage level.

3. The optical receiver of claim 1, wherein the bit rate-recognition circuit further comprises:
    a plurality of the logarithm amplifiers connected to sequentially amplify the sensing signal outputted from the bit rate-sensing circuit;
    a plurality of rectifiers respectively connected to one input of the respective logarithm amplifiers and to one output of at least one said logarithm amplifier, the recifiers configured to rectify the sensing signal inputted thereto; and,
    an adder connected to provide the sum of output signals of the plurality of rectifiers.

4. The optical receiver of claim 1, wherein the clock/data recovery circuit further comprises:
  a phase-locked loop circuit configured to generate a reference clock signal in accordance with the control circuit provided by the controller; and,
  at least one flip-flop connected to reproduce a clock signal and data, in accordance with the reference clock signal, from the amplified electrical signal supplied from the amplifier circuit.

5. The optical receiver of claim 4, wherein the phase-locked loop circuit further comprises:
  a phase comparator for comparing a frequency and a phase of the amplified electrical signal outputted from the amplifier circuit with those of the reference clock signal and consequently providing an error voltage according to the comparison;
  a loop filter for filtering the error voltage outputted from the phase comparator and providing the filtered error voltage; and,
  a voltage controlled oscillator for generating the corresponding reference clock signal on the basis of the error voltage of the loop filter and the control signal for oscillation of the controller.

6. The optical receiver of claim 1, wherein the controller comprises a memory configured to store a look-up table indicating a predetermined data set of the bit rate to the voltage level.

7. The optical receiver of claim 1, wherein the opto-electric converter further comprises a photo diode.

* * * * *